(12) United States Patent
Pind et al.

(10) Patent No.: US 8,246,777 B2
(45) Date of Patent: Aug. 21, 2012

(54) HONEYCOMB SANDWICH PANELS AND THE USE OF A TWO COMPONENT POLYURETHANE ADHESIVE IN THE MANUFACTURE THEREOF

(75) Inventors: Martin Pind, Copenhagen (DK); Bodil Olsen, Skaevinge (DK)

(73) Assignee: Sika Technology AG, Baar (CH)

( * ) Notice: Subject to any disclaimer, the term of this patent is extended or adjusted under 35 U.S.C. 154(b) by 1053 days.

(21) Appl. No.: 12/149,431

(22) Filed: May 1, 2008

(65) Prior Publication Data

US 2009/0035506 A1  Feb. 5, 2009

(30) Foreign Application Priority Data

Jun. 1, 2007  (EP) .................................. 07109388

(51) Int. Cl.
C09J 4/00 (2006.01)
C09J 101/00 (2006.01)
C09J 201/00 (2006.01)
B32B 3/00 (2006.01)
C08G 18/00 (2006.01)

(52) U.S. Cl. .................. 156/331.7; 428/73; 528/85

(58) Field of Classification Search .............. 156/331.7; 428/73; 528/85
See application file for complete search history.

(56) References Cited

U.S. PATENT DOCUMENTS

| 3,249,659 A | 5/1966 | Voelker |
| 3,638,573 A * | 2/1972 | Campbell ..................... 102/364 |
| 3,763,274 A | 10/1973 | Wang et al. |
| 3,853,681 A | 12/1974 | Kehr et al. |
| 4,521,545 A * | 6/1985 | Kerimis et al. .............. 521/107 |
| 2009/0214873 A1* | 8/2009 | Demmig .................... 428/423.1 |

FOREIGN PATENT DOCUMENTS

| EP | 0 716 106 A2 | 6/1996 |
| JP | A-2002-003811 | 1/2002 |
| JP | A-2006-282922 | 10/2006 |
| WO | WO 2006/084900 * | 8/2006 |
| WO | WO 2006/084900 A2 | 8/2006 |

* cited by examiner

*Primary Examiner* — Michael Orlando
(74) *Attorney, Agent, or Firm* — Oliff & Berridge, PLC

(57) ABSTRACT

The present invention relates to the manufacturing of honeycomb sandwich panels. Particularly a two component polyurethane adhesive having a Polyol P1 with a bisphenol-A or bisphenol-F moiety in its structure, a polyester or polyether Polyol P2, a heat-activated polyurethane catalyst CA and a polyisocyanate PI. The adhesive is remarkably well suited for the manufacturing of honeycomb sandwich panels showing particularly a short curing time combined with a long open time and good wetting and bonding properties.

20 Claims, 2 Drawing Sheets

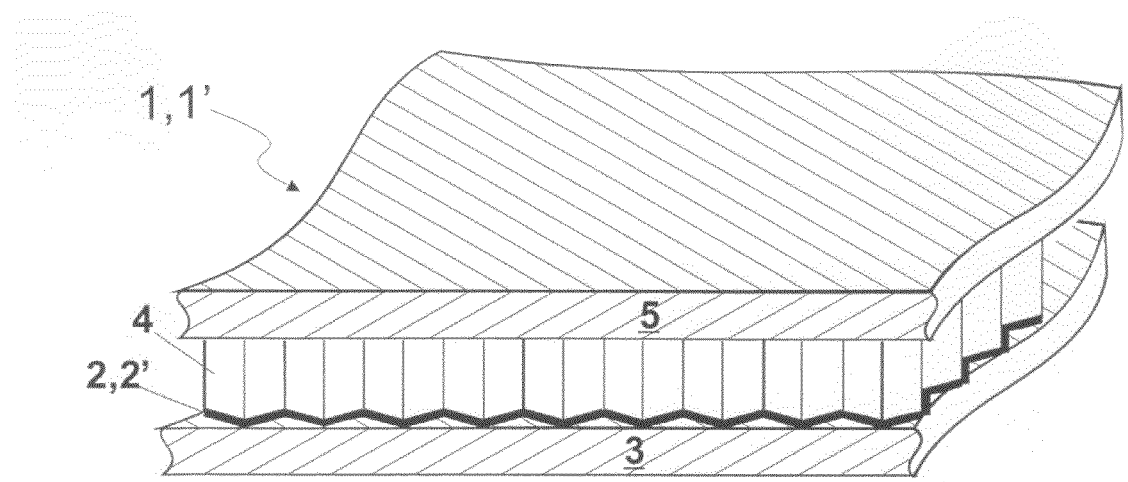
Figure 1e)
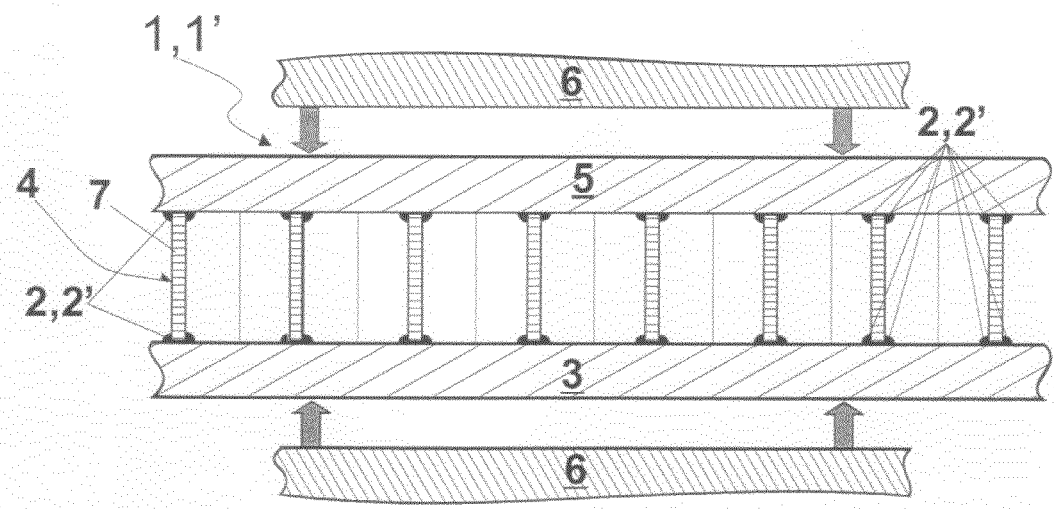
Figure 2)

HONEYCOMB SANDWICH PANELS AND THE USE OF A TWO COMPONENT POLYURETHANE ADHESIVE IN THE MANUFACTURE THEREOF

TECHNICAL FIELD

The invention relates to the field of the manufacture of honeycomb sandwich panels.

BACKGROUND OF THE INVENTION

Honeycomb sandwich panels are known already since long time. They are used especially in application there light weight structures are desired. Two component epoxy adhesives are normally used for the manufacturing of honey combs. However, due to its reactivity epoxy adhesives need either very high, typically temperatures of more than 100° C., or long pressing times, respectively fixation times, of typically more than 30 minutes, to be cured that the sandwich panels may be transported. Such high curing temperature and/or long pressing or fixation times are very unfavorable.

Two component polyurethane adhesives are known since long time. They are very fast curing and a broad range of elasticity is accessible. However the fast curing behavior, i.e. the short open time of typically less than 5 minutes is for the most applications too short. Furthermore, using such two component polyurethane adhesives the problem arises that that due their unfavorable viscosity and wetting behavior a high material consumption is necessary to manufacture the honeycomb sandwich panels.

SUMMARY OF THE INVENTION

Therefore, it is the problem to be solved by the present invention to use an adhesive for the manufacturing of honeycomb sandwich panels which has good mechanical properties for ensuring a reliable adhesive joint, has good wetting behavior and an open time which is optimal for the manufacturing of sandwich panels. Furthermore it is desired to have an adhesive which combines fast curing and long open time. Finally, the fixing times, respectively pressing times, should be reduced at a reduced curing temperature.

Unexpectedly this goal can be achieved by the use of a two component polyurethane adhesive composition for the manufacturing of honeycomb sandwich panels according to the embodiments of the inventions discussed below. By said use, honeycomb sandwich panels can be obtained which have excellent properties. Particularly, they have a very low weight due to the good wetting and creeping behavior of the adhesive as that the adhesive material is optimally used as it is at the correct site for the bonding. Furthermore, due to the good wetting behavior of the honeycomb, particular reduced to zero. The adhesive combines short curing times at elevated temperature and long open time at room temperature. Said honeycomb sandwich panels can be used in a large application fields, particularly in transportation and civil engineering. Therefore, further aspects of the invention are related to a honeycomb sandwich panel, an article comprising the honeycomb sandwich panel, and the use of honeycomb sandwich panels in the manufacturing of a transport vessel or in the construction of buildings.

Further advantageous embodiments of the invention are discussed below.

DETAILED DESCRIPTION OF THE INVENTION

The present invention relates in a first aspect to the use of a two component polyurethane adhesive composition for the manufacturing of honeycomb sandwich panels.

The two component polyurethane adhesive composition used herefore consists of two components C1 and C2.

The component C1 comprises
at least one polyol P1 having a bisphenol-A or bisphenol-F moiety in its chemical formula;
at least one polyester polyol or polyether polyol P2;
at least one heat-activated polyurethane catalyst CA.

The component C2 comprises at least one polyisocyanate PI

Substances starting with the prefix "poly" such as "polyol", "polyisocyanate", "polyamine" or "polymercaptane" refers in the present document to substances in question which formally contain two or more of those functional groups per molecule which occur in its term.

The term "polymer" refers in the present document on the one hand to a group of chemically uniform macromolecules which nevertheless differ in respect of degree of polymerization, molar mass, and chain length and have been prepared by a polymerization reaction (addition polymerization, polyaddition, polycondensation). On the other hand the term "polymer" in this document also embraces derivatives of such a group of macromolecules from polymerization reactions, in other words compounds which have been obtained by reactions, such as addition reactions or substitution reactions, for example, of functional groups on existing macromolecules and which may be chemically uniform or chemically nonuniform.

The term "polyurethane polymer" embraces, in the present document, all polymers prepared by the so called diisocyanate polyaddition process. This includes those polymers which are virtually or entirely free from urethane groups, such as polyether-polyurethanes, polyester-polyurethanes, polyether-polyureas, polyureas, polyester-polyureas, polyisocyanurates, polycarbodiimides, etc.

Component C1 comprises a polyol P1. Said polyol P1 has a bisphenol-A or bisphenol-F moiety in its chemical formula, i.e. said polyol P1 has at least one of the substructure of formula (I) in its chemical molecular formula.

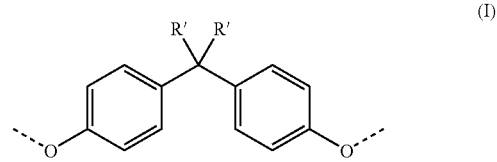

In formula (I) R' represents H or $CH_3$ and the dotted lines signify a bonding to rest of the molecule.

The bisphenol-A or bisphenol-F moiety of formula (I) can be bound particularly by ester or ether linkage.

The polyol P1 can be particularly prepared from a procedure comprising a step
of reacting a carboxylic acid or anhydrid or lacton with a bisphenol-A or bisphenol-F; or
of reacting digylcidylether of bisphenol-A or bisphenol-F with an alcohol, an carboxylic acid, an anhydride, a lacton, an amine or a mercaptane; or
of reacting bisphenol-A or bisphenol-F with an compound having a ring of the size of 3 to 6 atoms of which at least one atom is an oxygen atom, particularly an epoxide or tetrahydrofurane.

The polyol P1 may be a diol or triol or tetraol. Most preferred is polyol P1 a diol.

Preferably the polyol P1 is prepared from bisphenol-A or bisphenol-F and an epoxide, particularly from a glycidylether or glycidylester or ethylene oxide and/or propylene oxide and/or butylene oxide.

Most preferred polyols P1 are alkoxylated bisphenol-A or bisphenol-F of the formula (II)

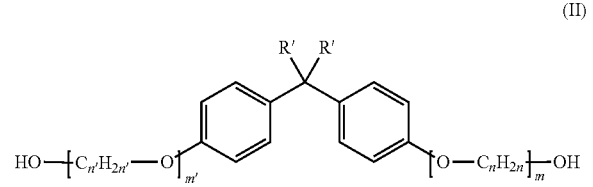

In formula (II) n and n' represent independently from each other a value of 2, 3 or 4 and m and m' represent independently from each other a value of 1 to 20, with the condition that the value of m+m' is 2 to 30, particularly 2 to 6.

For examples formula (II) may represent a polyalkoxylated bisphenol in which is has different oxyalkylene groups even in the same side of the bisphenol. If there are different oxyalkylene groups present they be arranged in blocks or randomly. For example a bisphenol-A or F may be first ethoxylated and then propoxylated if desired.

Preferred alkoxylated bisphenol-A or bisphenol-F are the propoxylated bisphenols, particularly propoxylated bisphenol-A.

The preferred molecular weight (Mw) of the polyol P1 is between 200 and 600 g/mol, particularly between 300 and 500 g/mol.

The total amount of all polyols P1 in component C1 is preferably 5-20% by weight, particularly 7-15% by weight.

Component C1 comprises at least one polyester polyol or polyether polyol P2.

As polyether polyol, for example, the following polyols, or any desired mixtures thereof may be used:

Polyoxyalkylene polyols, which are addition-polymerization products of ethylene oxide, 1,2-propylene oxide, 1,2- or 2,3-butylene oxide, tetrahydrofuran or mixtures thereof, optionally polymerized by means of a starter molecule having two or more active hydrogen atoms, such as water, for example, ammonia, or compounds having two or more OH or NH groups, such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the aforementioned compounds. Use may be made not only of polyoxyalkylene polyols which have a low degree of unsaturation (measured by ASTM D-2849-69 and expressed in milliequivalents of unsaturation per gram of polyol (meq/g)), prepared for example by means of what are called double metal cyanide complex catalysts (DMC catalysts), but also of polyoxyalkylene polyols having a higher degree of unsaturation, prepared for example using anionic catalysts such as NaOH, KOH or alkali metal alkoxides.

Particular suitability is possessed by polyoxyalkylene diols or polyoxy-alkylene triols, especially polyoxypropylene diols or polyoxypropylene triols. Especially suitable polyoxyalkylene diols or polyoxyalkylene triols are those having a degree of unsaturation of less than 0.02 meq/g and having a molecular weight in the range from 1000 to 30 000 g/mol, and also polyoxypropylene diols and triols having a molecular weight of 400 to 8000 g/mol. By "molecular weight" or "molar weight" is meant, in the present document, always the molecular weight average $M_n$, if not indicated differently. Such polyoxyalkylene polyols are commercially available for example from Bayer sold under the trademark Acclaim®. Likewise particularly suitable are what are called "EO-end-capped" (ethylene oxide-endcapped) polyoxypropylene diols or triols. The latter are special polyoxypropylene-polyoxyethylene polyols which are obtained, for example, by subjecting pure polyoxypropylene polyols, after the end of the polypropoxylation, to alkoxylation with ethylene oxide, and which, as a result, have primary hydroxyl groups.

As polyester polyol, for example, the following polyols, or any desired mixtures thereof may be used:

Polyester polyols prepared according to known procedures, particularly by polycondensation of hydroxycarbonic acids or by polycondensation of aliphatic and/or aromatic polycarbonic acids with polyhydric alcohols. Particularly suited are polyester polyols prepared, for example, from dihydric to trihydric alcohols such as, ethylene glycol, diethylene glycole, propylene glycol, dipropylene glycol, neopentylglycol, 1,4-butanediole, 1,5-pentanediole, 3-methyl-1,5-hexanediole, 1,6-hexanediole, 1,8-octanediole, 1,10-decanediole, 1,12-dodecanediole, 1,12-hydroxystearylalcohol, 1,4-cyclohexanedimethanol, dimeric fatty acid diol (dimerdiol), hydroxypivalinic acid neopentylglycol ester, glycerol, 1,1,1-trimethylolpropane or mixtures of the aforementioned alcohols with organic dicarboxylic acids or their anhydrides or esters, such as, for example, succinic acid, glutaric acid, adipic acid, suberic acid, azelaic acid, sebacic acid, dodecanedicarboxylic acid, maleic acid, fumaric acid, dimeric fatty acid, phthalic acid, isophthalic acid, terephthalic acid, and hexahydrophthalic acid, trimellic acid, trimellic acid anhydride or mixtures of the aforementioned acids, and also polyester polyols formed from lactones such as ε-caprolactone, for example, and starters such as the aforementioned dihydric or trihydric alcohols. Particularly suited are polyester di- and -trioles, particularly polyesterdiols, being liquid, amorphous, partial amorphous, partial crystalline or crystalline at room temperature. Particularly suited polyesterdiols being liquid at room temperature are solid at a temperature not far below room temperature, for example at a temperature between 0° C. and 25° C. Furthermore liquid polyesterdiols are combined preferably with a least one amorphous, partial crystalline or crystalline polyester polyol;

Polyesterspolyols being ester of hydroxycarbonic acids and the below mentioned low molecular weight polyols, such as hydroxyfunctional glycerides, particular glycerides of ricinoleic acid (castoroil).

The polyester polyols and/or polyether polyols P2 preferably have a average molecular weight of 250-30'000 g/mol, particularly of 300-10'000 g/mol.

In some cases it is advantageous to have several polyester polyols and/or polyether polyols P2 being part of component C1. Particularly a combination of a polyester polyol and a polyether polyol is preferred.

The total amount of all polyester polyols and/or polyether polyols P2 in component C1 is preferably 20-70% by weight, particularly 25-50% by weight.

Component C1 comprises further at least one heat-activated polyurethane catalyst CA. Examples of such heat-activated polyurethane catalysts CA are based on primary or secondary amine or tertiary amines. They can be blocked amines or salts or complex compounds of amines being thermolabile, like certain salts prepared from amines and inorganic or organic acids. Particularly suited heat-activated polyurethane catalysts CA based on cyclic tertiary amines. Preferred cyclic tertiary amine are 1,8-diaza-bicyclo[5.4.0]undecene-7 (DBU) and 1,5-diaza-bicyclo[4.3.0]nonene-5 (DBN). Such heat-activated polyurethane catalysts CA have a heat-activated, delayed action. The activation is related to the activation temperature, i.e. to the temperature at which the catalyst is showing its catalytic effect.

Most preferred as heat-activated polyurethane catalysts CA are based on 1,8-diaza-bicyclo[5.4.0]undecene-7 (DBU), such as for example the catalyst commercially available under the trade name POLYCAT® SA1/10 from Air Products.

The total amount of all heat-activated polyurethane catalysts CA is preferably 0.01-2% by weight, particularly 0.1-1% by weight.

Component C1 may comprise further isocyanate reactive ingredients. Particularly further polyols P3 or polyamines P3a or polymercaptanes may be used.

Examples for such additional polyols P3 are
- Polycarbonate polyols of the kind obtainable by reacting, for example, the alcohols mentioned above for the preparation of polyester polyols with dialkyl carbonates, diaryl carbonates, diphenyl carbonates or phosgene;
- Blockcopolymers having at least two hydroxyl groups, which carry at least two different blocks of the above mentioned polyether, polyester and/or polycarbonate structures;
- Polyacrylate and polymethacrylate polyols;
- Hydrocarbon polyols, also called oligohydrocarbonoles, such as polyhydroxy functional ethylene-propylene-, ethylene-butylene- or ethylene-propylene-dien-copolymers, such as those commercialized by the company Kraton Polymers, or polyhydroxy functional copolymer of dienes such as 1,3-butadiene or mixtures of dienes and vinylic monomers such as styrene, acrylonitrile or isobutylene, or polyhydroxy functional polybutadiene polyols, such as those being copolymerized from 1,3-butadiene and allylic alcohol and which might be hydrogenated;
- Polyhydroxy functional arylonitrile/butadiene-copolymers, such as those prepared from epoxides or aminoalcohols and arylonitrile/butadiene-copolymers being terminated by carboxylics groups (commercially available under the tradename Hycar® CTBN from Hanse Chemie);
- Low molecular weight polyols (molecular weight below 300 g/mol) particularly dihydric or polyhydric alcohols of low molecular weight, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane-dimethanol, hydrogenated bisphenol A, dimeric fatty alcohols, 1,1,1-trimethylolethane, 1,1,1-trimethylolpropane, glycerol, pentaerythritol, sugar alcohols, and other higher polyhydric alcohols, low molecular weight alkoxylation products of the aforementioned dihydric and polyhydric alcohols, and also mixtures of the aforementioned alcohols.

Examples for such additional polyamines P3a are
Ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 1,6-hexamethylenediamine, 2,2,4- and 2,4,4-trimethylhexamethylenediamine and mixtures thereof, 1,7-heptanediamine, 1,8-octanediamine, 4-aminomethyl-1,8-octanediamine, 1,9-nonanediamine, 1,10-decanediamine, 1,11-undecanediamine, 1,12-dodecanediamine, methylbis(3-aminopropyl)amine, 1,5-diamino-2-methylpentane (MPMD), 1,3-diaminopentane (DAMP), 2,5-dimethyl-1,6-hexamethylenediamine, cycloaliphatic polyamines such as 1,2-, 1,3- and 1,4-diaminocyclohexane, bis(4-aminocyclohexyl)-methane, bis(4-amino-3-methylcyclohexyl)methane, bis(4-amino-3-ethylcyclohexyl)methane, bis(4-amino-3,5-dimethylcyclohexyl)methane, 1-amino-3-aminomethyl-3,5,5-trimethylcyclohexane (isophoronediamine or IPDA), 2- and 4-methyl-1,3-diaminocyclohexane and mixtures thereof, 1,3- and 1,4-bis(aminomethyl)cyclohexane, 1-cyclohexylamino-3-aminopropane, 2,5(2,6)-bis(aminomethyl)bicyclo[2.2.1]heptane (NBDA, produced by Mitsui Chemicals), 3(4),8(9)-bis(aminomethyl)-tricyclo[$5.2.1.0^{2,6}$]decane, 1,4-diamino-2,2,6-trimethylcyclohexane (TMCDA), 3,9-bis(3-aminopropyl)-2,4,8,10-tetraoxaspiro[5.5]undecane, 1,3- and 1,4-xylylenediamine, aliphatic polyamines containing ether groups, such as bis(2-aminoethyl)ether, 4,7-dioxadecane-1,10-diamine, 4,9-dioxadodecane-1,12-diamine and higher oligomers thereof, polyoxyalkylene-polyamines having theoretically two or three amino groups, available for example under the name Jeffamine® (produced by Huntsman Chemicals), and mixtures of the aforementioned polyamines.

Preferred polyamines are 1,6-hexamethylenediamine, MPMD, DAMP, 2,2,4- and 2,4,4-trimethylhexamethylenediamine, 4-aminomethyl-1,8-octanediamine, IPDA, 1,3- and 1,4-xylylenediamine, 1,3- and 1,4-bis(aminomethyl)-cyclohexane, bis(4-aminocyclohexyl)methane, bis(4-amino-3-methylcyclohexyl)methane, 3(4),8(9)-bis(aminomethyl)tricyclo[$5.2.1.0^{2,6}$]decane, 1,2-, 1,3- and 1,4-diaminocyclohexane, 1,4-diamino-2,2,6-trimethylcyclohexane, polyoxyalkylene-polyamines having theoretically two or three amino groups, especially Jeffamine® EDR-148, Jeffamine® D-230, Jeffamine® D-400, and Jeffamine® T-403, and also, in particular, mixtures of two or more of the aforementioned polyamines.

The total amount of said polyols P3 or polyamines P3a or polymercaptanes in component C1 is preferably 10-30% by weight, particularly 15-25% by weight.

Component C2 comprises at least one polyisocyanate PI. Examples for suitable polyisocyanate PI are:
toluene-2,4- and -2,6-diisocyanate (TDI) and any desired mixtures of these isomers, diphenylmethane 4,4'-, 2,4'- and 2,2'-diisocyanate and any desired mixtures of these isomers (MDI), phenylene 1,3- and 1,4-diisocyanate, 2,3,5,6-tetramethyl-1,4-diisocyanatobenzene, naphthaline-1,5-diisocyanate (NDI), 3,3'-dimethyl-4,4'-diisocyanatodiphenyl (TODI), dianisidinediisocyanat (DADI), hexamethylene 1,6-diisocyanate (HDI), 2-methylpentamethylene 1,5-diisocyanate, 2,2,4- and 2,4,4-trimethylhexamethylene 1,6-diisocyanate (TMDI), decamethylene 1,10-diisocyanate, dodecamethylene 1,12-diisocyanate, lysine diisocyanate, lysine ester diisocyante, cyclohexane 1,3- and 1,4-diisocyanate and any desired mixtures of these isomers, 1-isocyanato-3,3,5-trimethyl-5-isocyanatomethylcyclohexane (isophorone diisocyanate or IPDI), 1-methyl-2,4- and -2,6-diisocyanatocyclohexane and any mixtures thereof (HTDI or $H_6TDI$), perhydrodiphenylmethane 2,4'- and 4,4'-diisocyanate (HMDI or $H_{12}MDI$), 1,4-diisocyanato-2,2,6-trimethylcyclohexane (TMCDI), m- and p-xylylene diisocyanate (XDI), tetramethylxylylene 1,3- and 1,4-diisocyanate (TMXDI), 1,3- and 1,4-bis(isocyanatomethyl)cyclohexane, bis-(1-isocyanato-1-methylethyl)-naphthaline, and also oligomers and polymers of the aforementioned isocyanates, and also any desired mixtures of the aforementioned isocyanates.

Diisocyanates are preferred as polyisocyanate PI. Particular preference is given to aromatic Diisocyanates. Maximum preference for polyisocyanate PI for is given to methylene diphenyl 4,4'-diisocyanate, methylene diphenyl 2,4'-diisocyanate, methylene diphenyl 2,2'-diisocyanate (MDI) or homologues thereof (polymeric MDI or PMDI).

Furthermore component C2 may comprise furthermore polyurethane polymers having isocyanate groups, also called polyurethane prepolymer. Suitable polyurethane polymer of this kind are prepared from at least one polyisocyanate and at least one of the aforementioned polyols P1, P2 and/or P3 and/or at least one of the aforementioned polyamines P3a. The reaction can take place by reacting the polyol/polyamine and the polyisocyanate by typical processes, for example at temperatures of 50° C. to 100° C., with the use if desired of appropriate catalysts, the polyisocyanate being used in an amount such that its isocyanate groups are present in a stoichiometric excess in relation to the hydroxyl groups of the polyol, respectively the amine group of the polyamine. The excess of polyisocyanate is selected such that the resulting polyurethane polymer, after all of the hydroxyl groups of the polyol have reacted, respectively after all amine groups of the polyamine have reacted, is left, for example, with a free isocyanate group content of 0.1 to 15% by weight, preferably 0.5 to 5% by weight, based on the polyurethane polymer as a whole. If desired, the polyurethane polymer can be prepared using plasticizers, in which case the plasticizers used contain no isocyanate-reactive groups.

The amount of polyisocyanate PI is typically selected such that the ratio of the isocyanate groups in component C2 to the groups reactive to isocyanate groups in component C1 is in the range of 0.8 to 1.2, particularly 0.9 to 1.1, preferred about 1.

Component C1 and/or component C2 may comprise further ingredients. As such further particularly suited are:

plasticizers, for example esters of carboxylic acids such as phthalates, for example dioctylphthalate, diisononylphthalate or diisodecylphthalat, adipates, for example dioctyladipate, azelates or sebacates, organic esters of phosphoric/phosphonic acid or of sulphonic acids solvents;

inorganic or organic fillers such as ground or precipitated calcium carbonates, which optionally are coated by stearates, carbon black, baryt es (BaSO$_4$), caolines, aluminum oxide, aluminum hydroxide, silica, particular highly dispersive silica produced by pyrolic processes, such as commercialized by Degussa as Aerosil®, PVC-powder or hollow balls;

fibres for examples made from polyethylene;

pigments, such as titanium dioxide or iron oxides;

catalysts, which accelerate the reaction of the isocyanate groups, such as organotin compounds for example dibutyltindiacetate, dibutyltindilaurate, dibutyltindichloride, dibutyltindiacetylacetonate or dioctyltindilaurate, compounds of bismuth for example bismuthtrioctoate or bismuthtris(neodecanoate), and compounds comprising tertiary amino groups for example 2,2'-dimorpholinodiethylether und 1,4-diazabicyclo[2.2.2]octane;

agents modifying rheologic properties, such as thickening agents or thixotropic agents, e.g. urea compounds, polyamide waxes, bentonites or pyrogenic silica or fumed silica;

drying agents such as molecular sieves, calcium oxide, highly reactive isocyanate e.g. p-tosylisocyanate, orthoesters of formic acid, alkoxysilanes e.g. tetraethoxysilane, organoalkoxysilanes e.g. vinyltrimethoxysilane;

coupling agents, particularly organoalkoxysilanes ("silanes") such as epoxy-silanes, vinylsilanes, (meth)acrylsilanes, isocyanatosilanes, carbamatosilanes, alkylsilanes, S-(alkylcarbonyl)-mercaptosilanes or aldiminosilanes, as well as the oligomeric forms of these silanes;

heat, UV or light stabilizers;

flame-retardants;

wetting agents, tensides, surfactants, dispersing agents or defoamers;

biocides such as algicides, fungicides or agents inhibiting fungal growth.

The man skilled in the art knows of course that such possible additional ingredients should not react or interact negatively with the other ingredients being present in said component.

As further ingredients preferred are thixotropic agents, preferably present in component C1 in an amount of 0.1 to 5% by weight, particularly 0.2 to 3% by weight;

fillers, preferably present in component C1 in an amount of 10 to 60% by weight, particularly 20 to 50% by weight;

wetting agents, preferably present in component C1 in an amount of 0.01 to 3% by weight, particularly 0.1 to 1% by weight;

catalyst, which accelerates the reaction of isocyanate groups, preferably present in component C1 in an amount of 0.001 to 1% by weight, particularly 0.001 to 0.1% by weight.

Preferably the component C1 comprises at least one polyol P1 having a bisphenol-A or bisphenol-F moiety in its chemical formula at least one polyester polyol or polyether polyol P2 at least one heat-activated polyurethane catalyst CA at least one polyol P3 at least one catalyst, which accelerates the reaction of isocyanate groups at least one thixotropic agent at least one inorganic filler at least one wetting agent The two component polyurethane adhesive composition is prepared according to a process which is known to the man skilled in the art. Particularly it is advantageous that its ingredients are anhydrous or at least dried before being used for the preparation of the component C1 and component C2. The preparation is preferentially made under a protective gas such as nitrogen. The so prepared component C1 and component C2 are preferably stored in a container which is sealed against the humidity of the environment. Suitable such containers are sealed plastic or metal foil bags, fluid bags, cartridges, pails, hobbocks and barrels, particularly with foil inlayers. In certain cases, it is preferred that the two containers are attached to each other. Particularly for small volume applications, it is very advantageous that the two containers for component C1 and component C2 are both part of a single package, such as a twin cartridge or side-by-side cartridge. Stored in the absence of water or humidity, particularly in an above mentioned container, the components are stable for longer time periods without altering significantly their properties particularly without reacting or gelling.

The two component polyurethane adhesive composition cures if component C1 and component C2 are mixed. The amount of component C2 to be mixed with component C1 is selected preferably so that the ratio of the isocyanate groups in component C2 to the groups reactive to isocyanate groups in component C1 is in the range of 0.8 to 1.2, particularly 0.9 to 1.1, preferred about 1 (stoichiometrical mixing).

The mixing can be done by known mixing means particularly by static or dynamic mixers.

The two component polyurethane adhesive has preferably a Brookfield viscosity, measured directly after mixing of the two components C1 and C2, in the range of 3'000 to 15'000 mPAS, such as in the range of 4'000 to 12'000 mPas, particularly in the range of 4'000 to 8'000 mPas, using a rotor nr. 5 and a rotor speed of 10 rotations per minutes at a temperature of 23° C. (Brookfield DV 11). Such viscosity is especially suited for an optimal application in the manufacturing of honeycomb sandwich panels.

The two component polyurethane adhesive has an open time which enables the adhesive to be applied and the parts of the honeycomb sandwich panel to be joined together. Preferably the open time of the two component polyurethane adhesive is 10 to 60 minutes, particularly of 30 to 45 minutes, at a temperature of 23° C. and relative humidity of 50%. The open time was measured by the following method:

The mixed adhesive is applied directly after the mixing in parallel beads spaced in 10 mm by using a nozzle having a round orifice of a diameter of 2 mm on a hardboard. The time starts running at the time of mixing. In regular time periods (all 5 minutes) individual honeycomb cells are put on the adhesive. After a curing time of 24 hours the honeycomb cells are removed one by one. The open time determined as the maximum time where 100% of the cell walls are wetted.

The adhesive has preferentially an open time of 10 to 60 minutes, particularly of 30 to 45 minutes, at a temperature of 23° C. and relative humidity of 50% combined with a curing time of 5 to 10 minutes at temperatures 60 to 80° C.

The adhesive is particular suited for the manufacturing of honeycomb sandwich panels.

The honeycomb sandwich panels are preferably manufactured by a process—which is a further aspect of the invention and—which comprises the following steps:
  i) mixing the component C1 and component C2 of an aforementioned two polyurethane adhesive composition,
  ii) applying the mixed adhesive on a panel substrate S1
  iii) contacting a honeycomb core with the mixed adhesive
  iv) applying the mixed polyurethane on a panel substrate S2
  v) joining the panel substrate S2 with the honeycomb core
  vi) pressing and heating the joint by means of a heated press.

The mixing of the two components C1 and C2 can be done by known mixing means, particularly by means of static or dynamic mixers. The panel substrates S1 and/or S2, also known by the expert in this field under the term "skin", i.e. skin S1 and/or skin S2, are preferably made of a metal, particularly of aluminum or an aluminum alloy. The aluminum preferably is a surface treated aluminum such as electrolytically oxidated aluminum (ELOXAL). The aluminum can also be surface treated by using an primer, particularly an epoxy primer.

Further metals are steel sheets, particularly galvanized steel. Further-more also certain non-metallic materials may be used as panel substrates S1 and/or S2, such as glass reinforced polyesters (GRPs), particularly if treated by corona, flame or plasma, particularly by open air plasma.

The mixed adhesive may be applied manually or automatically such as by means of robots. The adhesive can be applied in the form of beads, flat streams or swirls, but also in full face coverage.

The adhesive is applied in an amount of typically less than 500 g/m². It has been observed that even in amounts of 180-200 g/m² good wetting and bonding occurs with said adhesive.

The honeycomb core is made according to known production procedures. The size, diameters of the core and the materials used for its production are selected according to the desired mechanical requirements of the final honeycomb sandwich panels. Particularly the honeycomb core is made of a metal, particularly of aluminum or an aluminum alloy.

In step vi) the joint is pressed and heated by means of a heated press. The necessary temperature of the press depends on the activation temperature of the heat-activated polyurethane catalyst CA. Typically, the press is heated to a temperature of 50 to 100° C., particularly to a temperature of 60° C. to 80° C. The pressure of the press depends, among other parameters, on the geometric uniformity of the core. If the core is slightly bent or distorted a higher pressure needs to be applied when flat honeycomb sandwich panels are to be produced. A typical pressing pressure is between 0.5 and 0.9 bar.

The heated press is in contact with the joint for at least that period of time which is necessary for the adhesive to get at least cured to such an extend which allows the adhesive to ensure the honeycomb sandwich panels structure and geometry also after the release of pressure and during the transport. However, it may be that the final curing mechanical properties are not yet reached at this moment and that the curing of the adhesive can continue after this step at room temperature to reach final strengths. However, typically the adhesives have cured to a extend of more than 90% of their final cure which enables the honeycomb sandwich panels to be used directly after the press to the desired load.

Due to its ingredients the adhesive shows good wetting on contact of the core with the skin and on pressing the walls of the core. Therefore, it is ensured that an optimum adhesive joint between skin and core will be obtained after curing. It has been observed that the adhesive is found in the final cured state primarily only at the area where the core walls are in contact with the skins, i.e. the adhesives "creeps" to and up the edges of the honey comb cells.

Preferentially the adhesive has a Shore D hardness of 70 to 90, particularly of 75 to 80, after a pressing and heating step vi) at a temperature of 65 to 70° C. during 5 minutes.

A further aspect of the invention is therefore also a honeycomb sandwich panel which comprises
  a panel substrate S1
  a honeycomb core
  a panel substrate S2
  and a cured polyurethane adhesive bonding the panel substrate S1 to the one side of the honeycomb core and the panel substrate S2 to the other side of the honeycomb core,
  characterized in that the cured polyurethane adhesive is obtained by mixing the two components C1 and C2 of a aforementioned two component polyurethane adhesive, followed by heating the adhesive to a temperature of 50 to 100° C., particularly of 60 to 80° C.

The honeycomb sandwich panel can be used for different applications. Main uses for such honeycomb sandwich panel are in those areas where lightweight structures, which are able to bear and/or transmit high forces or moments, are desired.

Particularly honeycomb sandwich panel are used in the area of transportation and civil engineering.

In one preferred embodiment of the invention the honeycomb sandwich panel is used in the manufacturing of a transport vessel, particularly of a transport vessel on a road, on a track, in the water or the air, especially an automobile, a train, a bus, a lorry, a truck, a boat or an airplane. They can be also used for aerospace applications such as for building of rockets or space stations.

In another preferred embodiment of the invention the honeycomb sandwich panel is used in the civil engineering, especially in the construction of buildings, particularly as facade panels.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a schematic side view and a cross section through a honeycomb sandwich panel at different stages of its manufacturing.

FIG. 1e honeycomb sandwich panel

FIG. 2 shows a schematic cross section view through the joint when pressing and heating by means of a heated press to yield the honeycomb sandwich panel;

Only those elements that are essential for an understanding of the invention are shown. Same elements are identified in the different figure by the same designations. Movements are indicated by arrows. The invention is not limited to the embodiments shown in the figure and described here after.

In FIGS. 1a to 1e the process of manufacturing a honeycomb sandwich panel is schematically depicted.

FIG. 1a shows a panel substrate S1 3, also called skin S1 3. Preferably this skin is made out of aluminum.

FIG. 1b shows after the mixed adhesive 2 has been applied on the panel substrate S1 3, i.e. after step ii) in the aforementioned process. In this representation the adhesive has been applied in form of parallel beads.

In a following step the honeycomb core 4 has been contacted with the adhesive 2, i.e. FIG. 1b shows the situation after step iii) in the aforementioned process. Due to wetting properties the adhesive 2 wets nicely the core at the region of contact. The honeycomb core 4 is preferably made of aluminum.

FIG. 1d shows a panel substrate S2 5, also called skin S1 5, after the mixed adhesive 2 has been applied, i.e. the situation after step iv) in the aforementioned process. In this representation the adhesive has been applied in form of parallel beads. Preferably this skin is made out of aluminum.

Figure 1A:
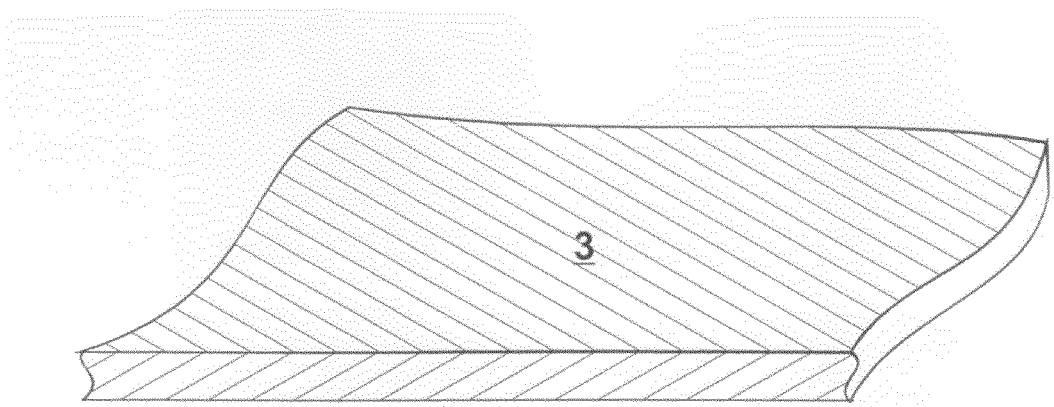
FIG. 1a substrate S1.
Figure 1B:
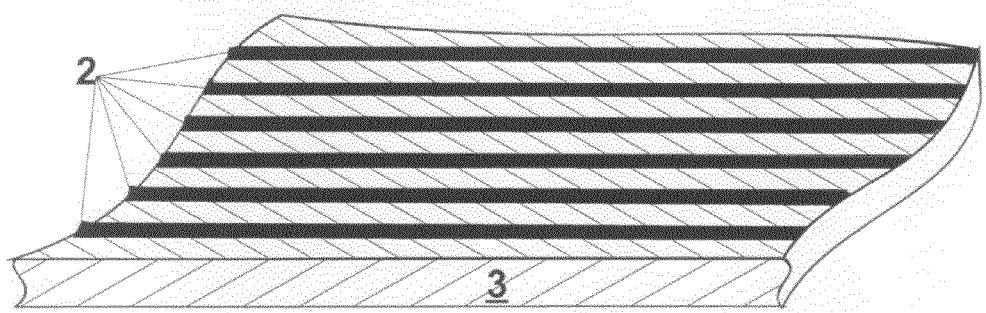
FIG. 1b substrate S1 after application of adhesive.
Figure 1C:
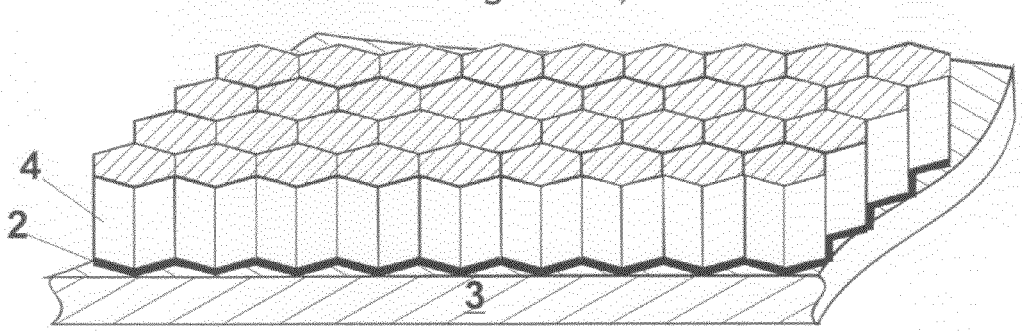
FIG. 1c substrate S1 after application of adhesive and contacting of honeycomb.
Figure 1D:
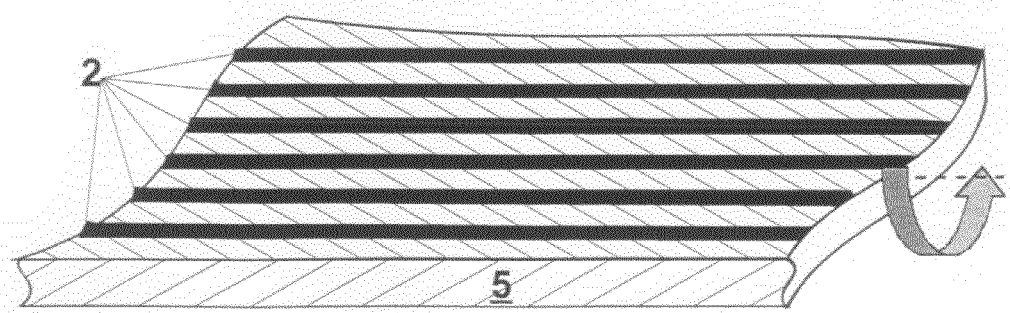
FIG. 1d substrate S2, after application of adhesive.

Then the substrate S2 5 with the applied adhesive 2 is turned and put on top of the intermediate substrate of FIG. 1c), corresponding to the situation after step v) in the aforementioned process, therefore forming a joint 1' shown in FIG. 1e). Following to this a heated press is brought into contact with joint 1' and by action of press and heat the adhesive 2 is cured or at least pre-cured leading to a honeycomb sandwich panel 1.

FIG. 2 shows schematically a cross section view through a joint 1' before pressing and heating, respectively through a honeycomb sandwich panel 1 after pressing and heating.

A heated press 6 is brought into contact with the joint 1' prepared as shown before, particularly in FIGS. 1a to 1e. By the effect of pressure and heat the adhesive 2 cures to a level in which the joint geometry can be maintained and transported, forming therefore a honeycomb sandwich panel 1. The adhesive 2, respectively the cured adhesive 2', is wetting nicely the walls 7 of the honeycomb core, and is and located at the site of contact of skins S1, S2 3, 5 and honeycomb core 4, and, therefore, bonding the panel substrate S1 3 to the one side of the honeycomb core 4 and the panel substrate S2 5 to the other side of the honeycomb core 4.

| List of designations | |
|---|---|
| 1 | Honeycomb sandwich panel |
| 1' | joint before heating and pressing |
| 2 | mixed adhesive |
| 2' | cured adhesive |
| 3 | panel substrate S1, skin S1 |
| 4 | honeycomb core |
| 5 | panel substrate S2, skin S2 |
| 6 | heated press |
| 7 | wall of the honeycomb core 4 |

EXAMPLES

Preparation of a Two Component Polyurethane Adhesive

A two component polyurethane adhesive has been prepared by using the ingredients indicated in table 1. The two components are mixed in a ratio of 100:25 by weight. The adhesive has a mixing viscosity of 5000 mPas (rotor nr. 5, a rotor speed of 10 rpm (Brookfield DV 11)) and an open time of 45 minutes at 23° C. and relative humidity of 50%.

TABLE 1

Preparation of two component polyurethane adhesive.

| Component C1 | |
|---|---|
| Polyesterpolyol [%] | 17.2 |
| OH-number: 150-170 mg KOH/g Mw = 900-1100 g/mol | |
| Polyether/Polyestertriol [%] | 10 |
| OH-number: 165-175 mg KOH/g | |
| Proproxylated bisphenol-A [%] | 10 |
| OH-number: 280 mg KOH/g, Mw = 400 g/mol | |
| Polyetherdiol [%] | 12 |
| OH-number: 28 mg KOH/g, Mw = 4000 g/mol | |
| Propoxylated glycerol [%] | 5 |
| Mw = 450 g/mol | |
| Aluminosilicate | 4 |
| Aerosil ® 200 (Degussa) [%] | 0.4 |
| Silica fume | |
| Ground calcium carbonate [%] | 41 |
| Polycat SA-1/10 [%] | 0.4 |
| heat-activated polyurethane catalyst based on DBU | |
| Dibutyltin dilaurate (DBTL) [%] | 0.003 |
| Component C2 | |
| Polymeric MDI (NCO content 31.5%) | 100 |
| Viscosity C1 (23° C., Brookfield, rotor nr. 5, 10 rpm, DV11) [mPas] | 8500 |
| Viscosity C2 (23° C., Brookfield, rotor nr. 5, 10 rpm, DV11) [mPas] | 250 |
| Mixing ratio C1/C2 (weight/weight)[g/g] | 100/25 |
| Mixing ratio C1/C2 (volume/volume)[m³/m³] | 100/29 |

The open time was determined as followed: The mixed adhesive is applied directly after the mixing in parallel beads spaced in 10 mm by using a nozzle having a round orifice of a diameter of 2 mm on a hardboard. The time starts running at the time of mixing. In regular time periods (all 5 minutes) individual honeycomb cells are put on the adhesive. After a curing time of 24 hours the honeycomb cells are removed one by one. The open time determined as the maximum time where 100% of the cell walls are wetted.

Preparation of a Honeycomb Sandwich Panel

The mixed adhesive 1 is applied in beads directly after mixing to aluminum skins and joined with an aluminum honeycomb core adhesive. After contacting the joint is pressed with a heated (temperature: 70° C., pressure: 0.5 bar) press during 5 minutes. The cured adhesive is located at the site where the honeycomb cells and the skins are in contact and all cells of the honeycomb are wetted by the adhesive. Inside the cells only a small trace of adhesive can be detected on the skin (where the bead has been applied). The properties of the cured adhesive are shown in table 2.

TABLE 2

Properties of cured adhesive.

| | |
|---|---|
| Shore D | 80 |
| Tensile strength (ISO 527-2) [MPa] | 8.5 |
| Elongation at break (ISO 527-2) [%] | 35 |

The invention claimed is:

1. A process of manufacturing a honeycomb sandwich panel comprising:
   mixing a component C1 and a component C2 of a two component polyurethane adhesive composition to obtain a mixed two component polyurethane adhesive;
   joining a panel substrate S1 to a honeycomb core with the mixed two component polyurethane adhesive;
   joining a panel substrate S2 to the honeycomb core with the mixed two component polyurethane adhesive; and
   pressing and heating, at a temperature of 50 to 100° C., a joint of the honeycomb sandwich panel by means of a heated press,
   wherein:
   the component C1 comprises at least one polyol P1 having a bisphenol-A or bisphenol-F moiety, at least one polyester polyol or polyether polyol P2, and at least one heat-activated polyurethane catalyst CA; and
   the component C2 comprises at least one polyisocyanate PI.

2. The process according to claim 1, wherein the adhesive has a Shore D hardness of 70 to 90 after heating at a temperature of 65 to 70° C. for 5 minutes.

3. The process according to claim 1, wherein at least one of the panel substrate S1 and the panel substrate S2 is made of a metal.

4. The process according to claim 1, wherein the honeycomb core is made of a metal.

5. The process according to claim 1, wherein the joint is heated at a temperature of 60 to 80° C.

6. The process according to claim 1, wherein the polyol P1 has a molecular weight Mw between 200 and 600 g/mol.

7. The process according to claim 1, wherein the heat-activated polyurethane catalyst CA is based on a tertiary amine.

8. The process according to claim 1, wherein the polyisocyanate PI is a diisocyanate.

9. The process according to claim 1, wherein at least one of the component C1 and component C2 further comprises a thixotropic agent.

10. The process according to claim 1, wherein the Brookfield viscosity, when measured directly after mixing of the components C1 and C2 with a rotor nr. 5 and a rotor speed of 10 rotations per minute at a temperature of 23° C. (Brookfield DV 11), is in the range of 3,000 to 15,000 mPas.

11. The process according to claim 1, wherein the adhesive has an open time of 10 to 60 minutes at a temperature of 23° C. and a relative humidity of 50%.

12. The process according to claim 1, wherein the adhesive has a curing time of 5 to 10 minutes at a temperature of 60° C. to 80° C.

13. The process according to claim 1, wherein the two component polyurethane adhesive composition comprises the polyisocyanate PI in such an amount that a ratio of the isocyanate groups in component C2 to the groups reactive to isocyanate groups in component C1 is 0.8 to 1.2.

14. A process of manufacturing an article comprising:
   performing the process of manufacturing a honeycomb sandwich panel according to claim 1, and
   providing the honeycomb sandwich panel to the article under manufacture.

15. A process of manufacturing a transport vessel comprising:
   performing the process of manufacturing a honeycomb sandwich panel according to claim 1, and
   providing the honeycomb sandwich panel to the transport vessel under manufacture.

16. A process of constructing a building comprising:
   performing the process of manufacturing a honeycomb sandwich panel according to claim 1, and
   providing the honeycomb sandwich panel to the building under construction.

17. The process according to claim 1, wherein the polyol P1 has a molecular weight Mw between 300 and 500 g/mol.

18. The process according to claim 1, wherein the heat-activated polyurethane catalyst CA is based on a cyclic tertiary amine.

19. The process according to claim 1, wherein the polyisocyanate PI is methylene diphenyl 4,4'-diisocyanate, methylene diphenyl 2,4'-diisocyanate, methylene diphenyl 2,2'-diisocyanate (MDI) or polymeric MDI (PMDI).

20. The process according to claim 1, wherein the adhesive has an open time of 30 to 45 minutes at a temperature of 23° C. and a relative humidity of 50%.

* * * * *